United States Patent [19]
De Bernardi

[11] Patent Number: 5,787,767
[45] Date of Patent: Aug. 4, 1998

[54] TOOL-HOLDER TURRET

[75] Inventor: Franco De Bernardi, Busto Arsizio, Italy

[73] Assignee: Duplomatic S.r.l., Varese, Italy

[21] Appl. No.: 735,442

[22] Filed: Jan. 2, 1997

[30] Foreign Application Priority Data

Jan. 5, 1996 [EP] European Pat. Off. ............ 96830001

[51] Int. Cl.$^6$ ............................................. B23B 23/24
[52] U.S. Cl. .................. 74/813 L; 74/813 R; 74/813 C
[58] Field of Search ................ 74/813 R, 813 C, 74/813 L, 567, 569, 826; 188/31; 475/196

[56] References Cited

U.S. PATENT DOCUMENTS

| | | | |
|---|---|---|---|
| 2,975,657 | 3/1961 | Samuel | 74/822 |
| 3,595,110 | 7/1971 | Topliss | 74/826 X |
| 3,718,055 | 2/1973 | Maier | 74/826 |
| 3,842,947 | 10/1974 | Hofmann | 74/813 L X |
| 4,015,487 | 4/1977 | Pfister | 74/813 L |
| 4,202,227 | 5/1980 | Thumm | 74/813 L X |
| 4,333,363 | 6/1982 | Inaba et al. | 74/826 |
| 4,706,351 | 11/1987 | Chuang | 74/826 |
| 4,867,013 | 9/1989 | Braunberger | 74/813 R |
| 4,972,744 | 11/1990 | Sauter et al. | 74/813 L X |

FOREIGN PATENT DOCUMENTS

| | | |
|---|---|---|
| 0 059 494 | 9/1982 | European Pat. Off. |
| 32 09 512 | 10/1982 | Germany |
| 41 35 735 | 10/1982 | Germany |
| 01272615 | 9/1993 | Italy |

*Primary Examiner*—Vinh T. Luong
*Attorney, Agent, or Firm*—McDermott, Will & Emery

[57] ABSTRACT

A rotatable tool-holder turret for lathes, work-centers and the like, comprises a stationary base body with a cavity which extends along a longitudinal axis, a tool-holder table rotatable relative to the stationary base body, an element with teeth for locking and releasing the rotatable table relative to the stationary body, a drive mechanism for moving the table between working positions spaced angularly around the longitudinal axis, as well as a compressed air operated cylinder-piston for moving the locking and release element axially. The turret includes a mechanism for amplifying the axial thrust generated by preloaded springs, the mechanism holding the locking element mechanically in the position in which the turret is locked, by a plurality of balls which are movable radially relative to the longitudinal axis of the turret and which can be inserted between and released from facing walls, including at least one conical wall of the locking element and of a wall of a second, stationary tubular element.

9 Claims, 4 Drawing Sheets

5,787,767

TOOL-HOLDER TURRET

BACKGROUND OF THE INVENTION

The present invention relates to a rotatable tool-holder turret for lathes, work-centres and the like, of the type comprising a stationary base body with a cavity which extends along a longitudinal axis, a tool-holder table rotatable relative to the stationary base body about an axis of rotation coaxial and coinciding with the longitudinal axis of the cavity, a first ring of teeth carried by the stationary body and distributed around the longitudinal axis of the cavity, a second ring of teeth concentric with the first and carried by the rotatable tool-holder table, both of the rings having the same number of teeth, a locking element having a third ring of teeth facing towards the teeth of the first and second rings and movable axially between a first position for locking the turret, in which its teeth are simultaneously meshed with those of the first and of the second rings, and a second position for releasing the turret, in which they are disengaged, drive means for moving the table between working positions spaced angularly around the longitudinal axis, as well as means for moving the locking element between its positions.

Turrets of the type mentioned above are known in the art and are described, for example, in published Italian patent application MI 93A 001968.

According to the prior art, whereas the drive means for rotating the tool-holder table of the turret are generally electric, those for locking and releasing it relative to the stationary body in the working positions are generally constituted by cylinder-piston means using pressurized oil as the hydraulic fluid.

This fluid is in fact generally considered optimal in hydraulic controls, owing to its characteristic of being able to operate at high operating pressures and thus to exert large thrusts on the members controlled whilst maintaining limited dimensions of the active surfaces and consequently a small size of the mechanisms.

However, the use of pressurized oil as the hydraulic fluid involves some functional problems amongst which may be mentioned the high degree of heating of the members, which therefore need cooling devices, and the inevitable leakages of fluid.

To prevent the problems indicated above, it would be desirable to use compressed air as the hydraulic fluid for the cylinder-piston devices but, since compressed air is usually available to machine tools at pressures considerably lower than those of oil, its use would involve a considerable increase in the dimensions of the drive members in order to achieve locking and release forces comparable with those which can be achieved with pressurized oil and hence an unacceptable size of the turrets on the machine tools for which they are intended.

SUMMARY OF THE INVENTION

Therefore, the problem upon which the present invention is based is that of being able to use compressed air as the hydraulic fluid for the locking and release of toolholder turrets without the need to increase the size of the drive members, at the same time achieving operating and safety characteristics better than those offered by turrets with drive members operated by pressurized oil.

The problem is solved by a turret of the type specified which is characterized in accordance with claim 1 below.

BRIEF DESCRIPTION OF THE DRAWINGS

The invention will now be described in greater detail with reference to an embodiment thereof illustrated in the appended drawings, in which.

DETAILED DESCRIPTION OF THE INVENTION

Figure 1:
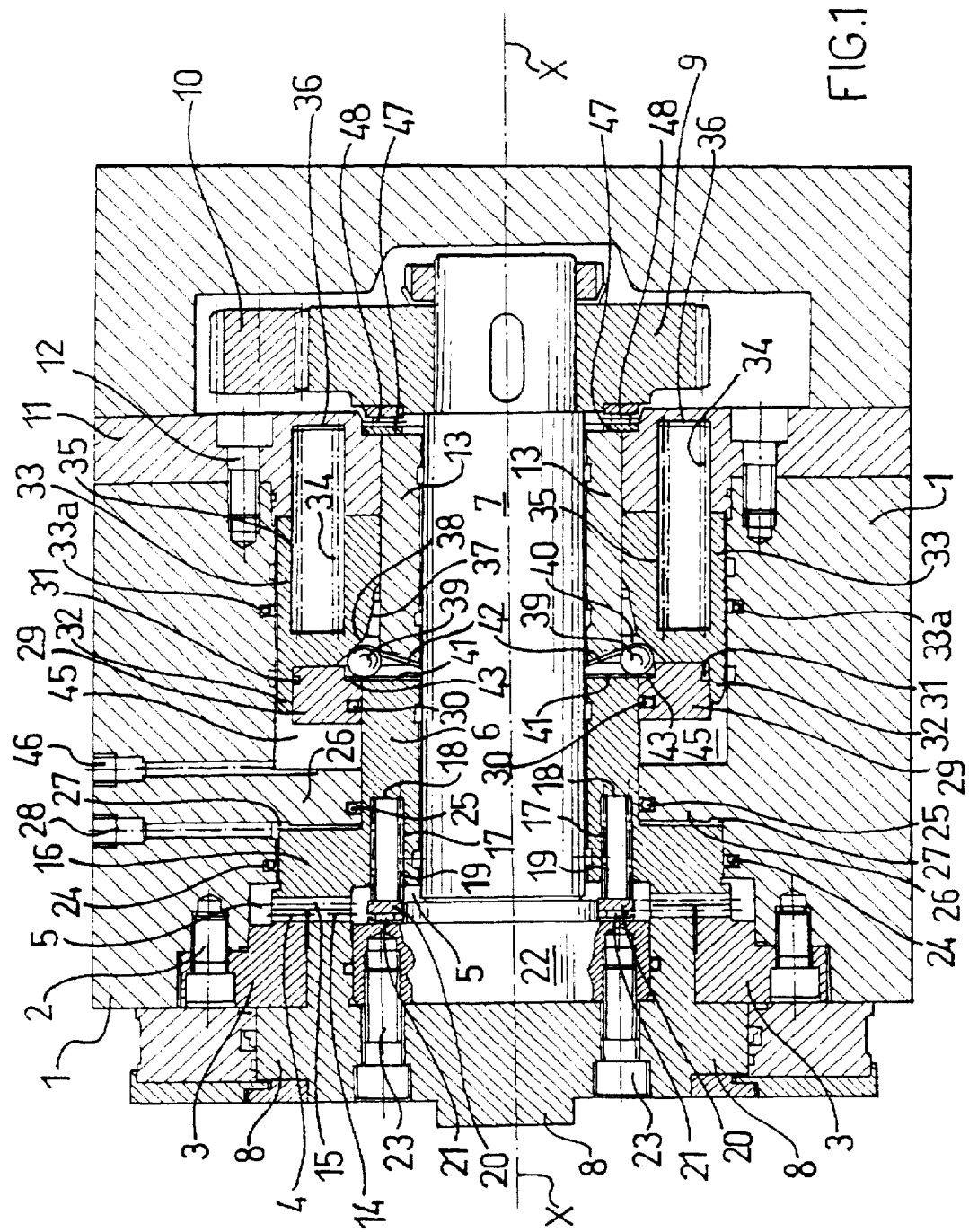
FIG. 1 is a longitudinal transverse section of the turret in the condition in which it is locked in a working position.

With reference to the drawings mentioned above and particularly to FIG. 1, the stationary body of the turret is indicated 1 a ring 3 carrying a first ring of teeth 4 being fixed thereto by means of screw connection elements 2.

An axial cavity 5 which extends along the axis X—X defined by the stationary body 1 houses a first tubular element 6 in which is mounted a shaft 7 for supporting and rotating a rotatable table 8 on which the various tools, not shown, of the turret are mounted in conventional manner.

The table 8 is rotated by means of a gear 9 keyed to the shaft 7 and a pinion 10 which in turn takes the drive from an external drive unit, not shown.

The shaft 7 is supported at the end facing the gear 9 by a plate 11 fixed to the body 1 by means of screw members 12 with the interposition of a second tubular element 13 coaxial with the first tubular element 6.

The rotatable table 8 has a second ring of teeth 14 positioned concentrically inside the ring of teeth 4.

The first tubular element 6 also has a third ring of teeth 15 carried by an integral radial flange 16 of the element.

The teeth 15 face the teeth 4 and 14 and their simultaneous meshing therewith locks the rotatable table 8, fixing it to the stationary body 1.

Correspondingly, the release of the ring of teeth 15 from the rings of teeth 4 and 14 releases the turret and enables the table 8 to rotate relative to the body 1.

These methods of operation are conventional in the art and do not need further description.

The tubular element 6 can therefore be displaced axially on the shaft 7 of the turret between a first position for locking the turret in which the teeth 15 are meshed with the teeth 4 and 14 and a second position for releasing the turret, in which the teeth 15 are disengaged from the teeth 4 and 14.

The tubular element 6 has a plurality of axial housings 17 with blind ends 18 distributed in a circle and housing springs 19.

Each spring 19 reacts at one end against the blind end 18 and at the other end against a frontal ring 20 of a thrust bearing 21 carried by a body 22 fixed to the table 8 by screw members 23.

The radial flange portion 16 of the element 6 behaves like a piston operating in the cavity 5 with radial sealing rings 24 and 25 carried, respectively, by the body 1 and by an annular extension 26 of the body 1, relative to which it forms a chamber 27.

This latter chamber is in communication with a source of compressed air, not shown, and, alternatively, with the exhaust, by means of the duct 28.

A ring 29 mounted on the first tubular element 6 in a position concentric with the longitudinal axis X—X of the turret, has a ring 30 for sealing against the element 6 and a ring 31 for sealing against a tubular appendage 32 of a sleeve 33.

The latter is mounted for sliding axially on the second tubular element 13 with sealing against the body 1 by means of a seal 33a.

Preloaded springs 34 distributed in a circle between the sleeve 33 and the rear closure wall 11 are housed in blind holes 35 and 36 in the sleeve 33 and in the wall 11, respectively.

The internal surface of the sleeve 33 which faces towards the second tubular element 13 is formed with two adjacent conical profiles 37 and 38 which are intended to act on a plurality of balls 39 housed in a cavity 40 formed between the end wall 41 of the first tubular element 6, the opposed end wall 42 of the second tubular element 13 and the end wall 43 of the ring 29.

When the turret is in the released position as shown in FIG. 1, this latter wall is coplanar with the wall 41. In the embodiment illustrated, both of the walls 41 and 43 are perpendicular to the axis X—X of the turret.

The opposed wall of the second tubular element 13, on the other hand, is inclined to the axis X—X with the consequence that the portion of the cavity 40 which is between the opposed walls assumes a wedge-shaped cross-section.

The second tubular element 13, the sleeve 33 with its conical profiles 37, 38, the balls 39, the ring 29 and the opposed walls 41, 42, 43 constitute a mechanism for amplifying the axial thrust exerted by the preloaded springs 34, as will become clearer from the following description.

Figure 4:
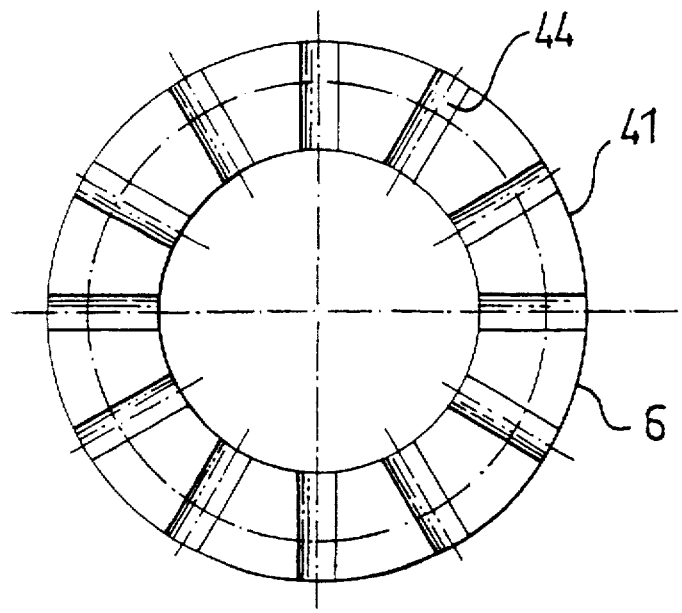
FIG. 4 is a view of the end wall of the element for locking the turret, provided with grooves for guiding balls of the mechanical thrust amplifier.

Grooves such as those indicated 44 in FIG. 4 are formed in the walls 41, 42, and 43 for guiding the balls 39 and for enabling a high specific Pressure to be used on the surfaces of the balls 39 during the operation of the amplifier mechanism.

An annular cavity 45 formed between the annular appendage 26 of the body 1 and the ring 29 is in communication with a source of compressed air, not shown, or, alternatively, with the exhaust, by means of a duct 46.

The second tubular element 13 is in axial abutment with a ring 47 of the thrust bearing 48 fitted between the wall 11 and the gear 9.

Figure 2:
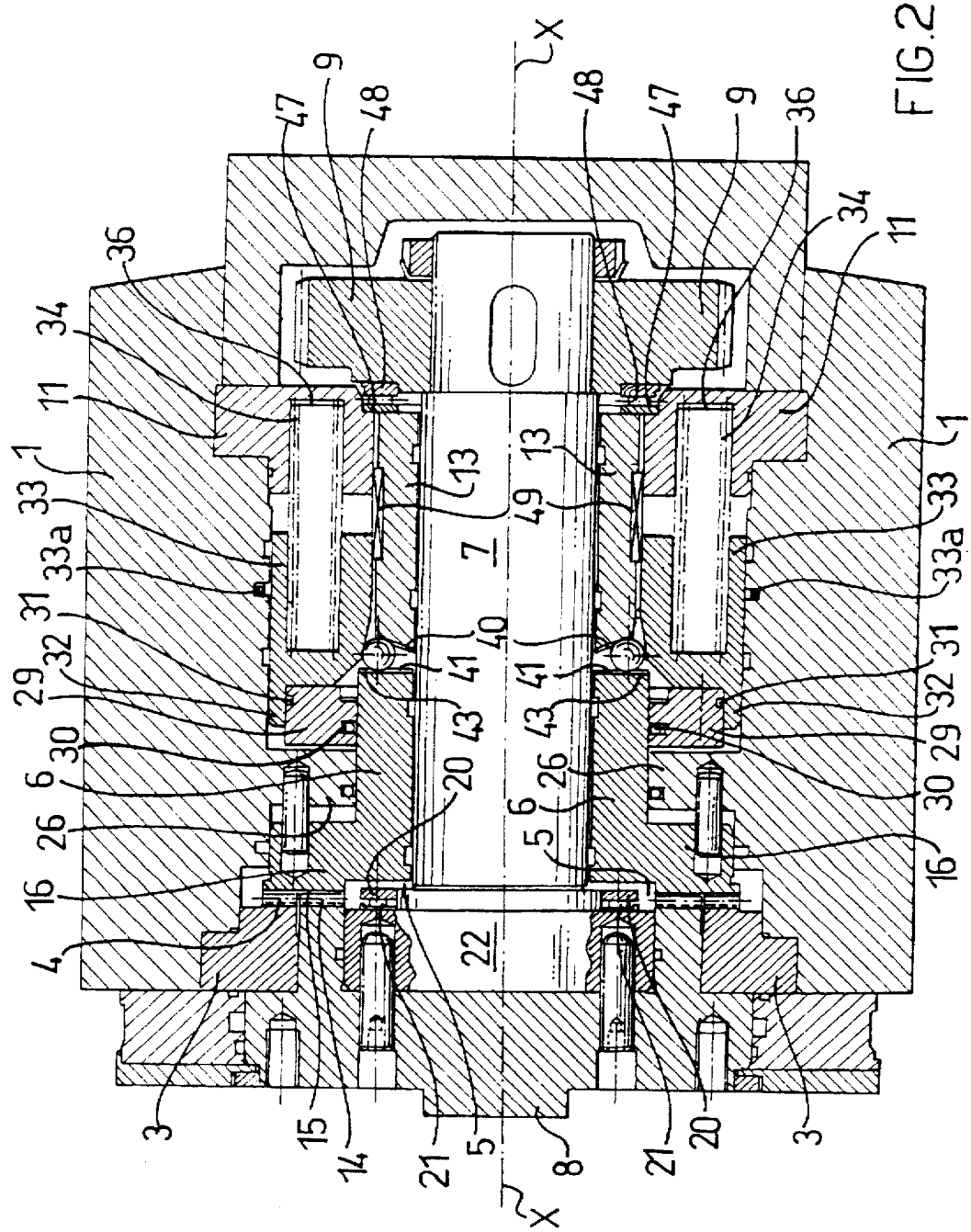
FIG. 2 is also a longitudinal transverse section but is angularly offset relative to the previous one with the turret in the released position.
Figure 3:
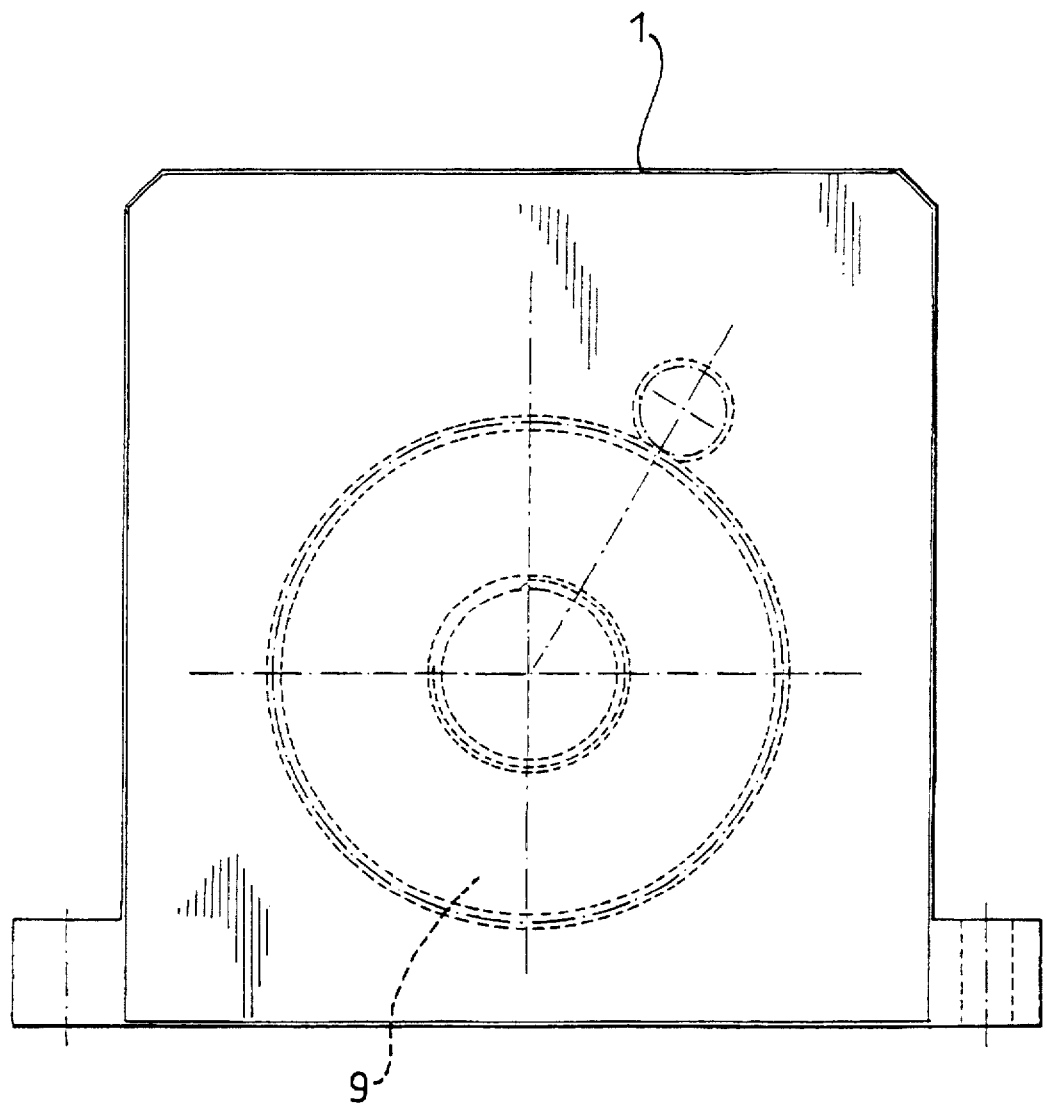
FIG. 3 is a rear view of the turret of FIGS. 1 and 2.

A key 49 best as seen in FIG. 2 allows the sleeve 33 to slide relative to the second tubular element 13 but prevents rotation thereof.

It is clear from the foregoing that the locking and release of the turret take place in the following manner.

It can be seen from an observation of the released position shown in FIG. 1 that, if compressed air is admitted to the chamber 27 through the duct 28, the first tubular body 6 is urged towards the left, as seen in the drawing mentioned, bringing about meshing of the teeth 15 with the teeth 4 and 14 of the rings facing the flange 16 of the tubular element.

At the same time, the springs 19 are compressed against the ring 20 of the bearing 21.

Since the thrust exerted by the compressed air on the flange 16 which acts as a piston may not be sufficient to ensure secure locking of the turret during the operation of the tools, in view of the relatively low pressure available, secure locking is ensured by the thrust-amplifier mechanism.

In fact, the retraction of the first tubular element 6 towards the left moves the wall 41 away from the opposed wall 42 of the second tubular element 13, which is stationary, consequently inserting the balls 39 in the wedge-shaped region of the cavity 40.

At the same time since the chamber 45 is connected to the exhaust by means of the duct 46, it allows the preloaded springs 34 to expand, consequently displacing both the ring 29 and the sleeve 33.

The latter first of all brings about radial displacement of the balls 39 towards the axis X—X with its first conical surface 38 and, in the second place finally inserts and keeps the balls locked between the inclined walls 41, 42 by means of the adjacent conical surface 37.

The inclination of the conical surface 37 to the axis X—X is such as to result in a radial thrust on the balls 39 many times greater than the axial thrust of the preloaded springs 34, consequently restraining the first tubular element 6 mechanically in its locking position with the teeth 15 meshed with the rings of teeth 4 and 14.

The closure thrust of the element 6 is also amplified by the wedge effect which occurs between the walls 41 and 42 and on the balls 39, whilst the reaction on the second tubular element 13 is discharged to the thrust bearing 48 and from this to the other members mechanically connected thereto.

It should be noted that, even in the event of a shortage of compressed air, the condition described above in which the turret is locked remains unchanged which is very advantageous for the intrinsic safety of the turret during operation when the tools are engaged in machining.

When the turret is released, the compressed air is sent into the chamber 45 through the duct 46.

The pressure brings about a thrust on the ring 29 and on the sleeve 33 which is thus displaced towards the right as seen in FIGS. 1 and 2.

Since displacement in this direction only brings about recompression of the springs 34, the thrust which has to be generated by the compressed air on the ring 29 and on the sleeve 33 need only be sufficient to reload the springs 34 without therefore requiring large thrust areas which would adversely affect the dimensions of the turret.

The displacement of the sleeve 33 releases the balls 39 from their engagement between the walls 41 and 42; they can therefore move radially away from the axis X—X thus permitting displacement of the first tubular element 6 towards the right, which is facilitated by the thrust of the springs 19 which were loaded during the locking of the turret.

The teeth 15 are therefore disengaged from the teeth 4 and 14 and the table 8 is free to rotate in order to take up another working position.

Figure 5:
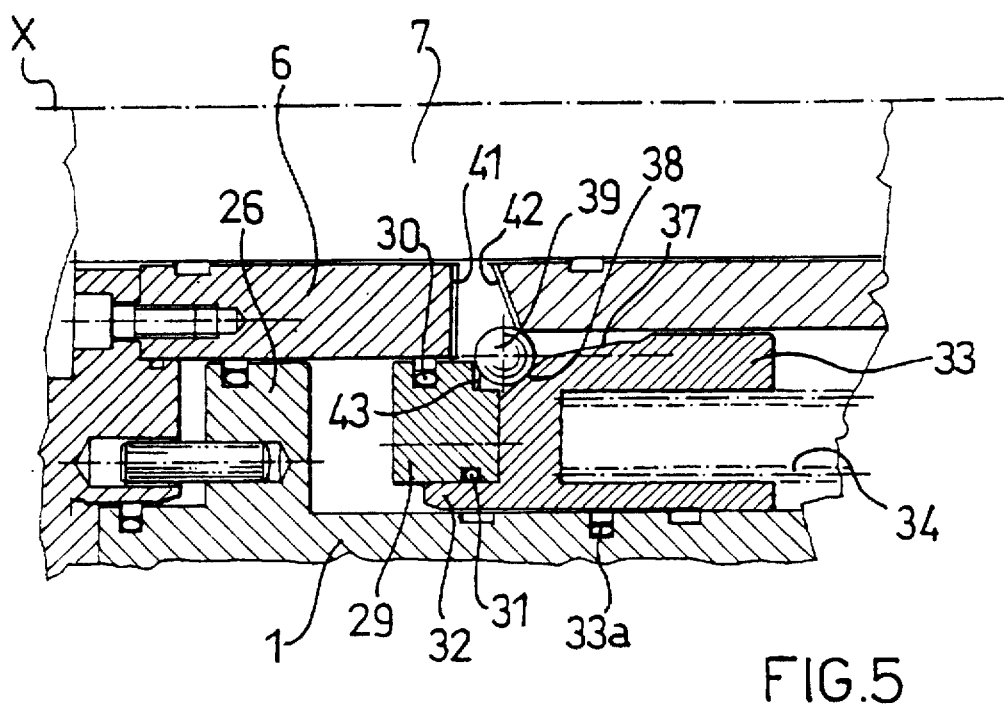
FIG. 5 is a partial section of the mechanical thrust amplifier in a position intermediate the locked and released positions of the turret.

It should be noted that, during the release of the turret, the admission of compressed air to the annular chamber 45 first of all brings about displacement of the ring 29 together with the sleeve 33. The configuration reached is that shown in FIG. 5.

Immediately afterwards since the balls 39 are released from the wedge-shaped space between the facing walls 41 and 42, the first tubular locking element 6 is retracted under the action of the compressed springs 19, bringing the wall 41 to a position in which it is coplanar with the wall 43 of the ring 29.

I claim:

1. A rotatable tool-holder turret comprising:
   a stationary base body having a cavity extending along a longitudinal axis;
   a tool-holder table rotatable relative to the stationary base body about an axis of rotation coaxial and coincident with said longitudinal axis;
   a first ring of teeth carried by said stationary body and distributed around said longitudinal axis of said cavity;

a second ring of teeth, concentric with said first ring of teeth and carried by said tool-holder table;

a third ring of teeth fixed to a first tubular element and axially moveable between a first, turret locking position in which its teeth are simultaneously meshed with said first and second rings of teeth, and a second, turret releasing position in which said third ring of teeth is disengaged from said first and second rings of teeth;

drive means for moving said table between working positions, said working positions being spaced angularly about said longitudinal axis;

means for moving said first tubular element between said turret locking and turret releasing positions;

a second, stationary, tubular element disposed coaxially with said first tubular element and axially spaced therefrom;

wherein said first and second tubular elements have opposing end walls, at least one of said opposed end walls being inclined to said longitudinal axis;

a sleeve coaxial and concentric with said second tubular element;

a plurality of moveable spacers disposed proximate to said second tubular element;

a plurality of preloaded springs for providing a bias force against said moveable spacers;

a fluid actuated cylinder-piston member for exerting a force against an opposite side of said moveable spacer; said moveable spacer being movable radially into and out of a space between said end walls; and a surface, inclined to said longitudinal axis, formed on said sleeve and in operative contact with said moveable spacer.

2. A turret according to claim 1, wherein said inclined surface of said sleeve has adjacent first and second portions, said first portion being less inclined to said longitudinal axis than said adjacent second portion, said second portion being positioned adjacent to said cylinder-piston member and facing said opposing end walls.

3. A rotatable tool-holder turret according to claim 2, wherein the opposed end walls of said first and second tubular members form a radially divergent annular gap and the second end portion of said sleeve is positioned to face said gap.

4. A turret according to claim 1, wherein said front walls of said first and second tubular elements have radial grooves for housing said moveable spacers.

5. A turret according to claim 1, wherein said cylinder-piston member operating on said sleeve comprises a ring-shaped element forming a seal at an end of said sleeve.

6. A turret according to claim 5, wherein said ring-shaped element has an annular wall which is coplanar with said end wall of said first tubular element in said turret releasing position.

7. A turret according to claim 1, wherein said first tubular element has a plurality of springs housed in blind holes annularly distributed about the body of said first tubular element, said plurality of springs being compressed when said turret is in said locked position and expanded in the released position.

8. A rotatable tool-holder turret according to claim 1, wherein said fluid is compressed air.

9. A rotatable tool-holder turret according to claim 1, wherein said moveable spacers are balls.

\* \* \* \* \*